(12) United States Patent
Nakamura et al.

(10) Patent No.: US 10,461,340 B2
(45) Date of Patent: Oct. 29, 2019

(54) ENERGY MANAGEMENT SYSTEM, ENERGY MANAGEMENT APPARATUS, AND POWER MANAGEMENT METHOD

(71) Applicant: KYOCERA CORPORATION, Kyoto (JP)

(72) Inventors: Kazutaka Nakamura, Yokohama (JP); Kenta Okino, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 776 days.

(21) Appl. No.: 14/348,030

(22) PCT Filed: Sep. 28, 2012

(86) PCT No.: PCT/JP2012/075251
§ 371 (c)(1),
(2) Date: Mar. 27, 2014

(87) PCT Pub. No.: WO2013/047843
PCT Pub. Date: Apr. 4, 2013

(65) Prior Publication Data
US 2014/0242490 A1    Aug. 28, 2014

(30) Foreign Application Priority Data

Sep. 28, 2011 (JP) ................. 2011-213575

(51) Int. Cl.
| | | |
|---|---|---|
| H01M 8/00 | (2016.01) | |
| H01M 8/04007 | (2016.01) | |
| H01M 8/04701 | (2016.01) | |
| H01M 8/0432 | (2016.01) | |
| H01M 8/12 | (2016.01) | |
| H01M 8/04537 | (2016.01) | |
| H01M 8/124 | (2016.01) | |

(52) U.S. Cl.
CPC ..... H01M 8/04007 (2013.01); H01M 8/0432 (2013.01); H01M 8/04701 (2013.01);
(Continued)

(58) Field of Classification Search
CPC ......... H01M 8/04007; H01M 8/04701; H01M 8/04731; H01M 8/0432; H01M 8/12;
(Continued)

(56) References Cited

U.S. PATENT DOCUMENTS

2005/0142405 A1* 6/2005 Nagamitsu ............. G06Q 50/06
                                                         705/412
2007/0119368 A1   5/2007 Perttila et al.
(Continued)

FOREIGN PATENT DOCUMENTS

| JP | 2004-006217 A | 1/2004 |
|----|---------------|--------|
| JP | 2006-100006 A | 4/2006 |

(Continued)

OTHER PUBLICATIONS

Translation of JP 2006-100006A obtained from AIPN website.*
(Continued)

*Primary Examiner* — Nicholas P D'Aniello
(74) *Attorney, Agent, or Firm* — Procopio Cory Hargreaves and Savitch LLP

(57) ABSTRACT

A power management system 1 comprises: a control unit 540 that performs high-temperature maintaining control maintaining a temperature of an SOFC 110 during an operation within a predetermined temperature range; and a specifying unit 530 that specifies a period during which the high-temperature maintaining control should be performed. The control unit 540 performs the high-temperature maintaining control in the period specified by the specifying unit 530.

7 Claims, 3 Drawing Sheets

(52) U.S. Cl.
CPC .... *H01M 8/04731* (2013.01); *H01M 8/04604* (2013.01); *H01M 8/12* (2013.01); *H01M 2008/1293* (2013.01); *H01M 2250/10* (2013.01); *H01M 2250/40* (2013.01); *H01M 2250/405* (2013.01); *Y02B 90/14* (2013.01); *Y02B 90/16* (2013.01); *Y02E 60/525* (2013.01); *Y02E 60/56* (2013.01); *Y02P 90/40* (2015.11)

(58) Field of Classification Search
CPC ......... H01M 8/04604; H01M 2250/10; H01M 2250/40; H01M 2250/405; H01M 2008/1293
See application file for complete search history.

(56) References Cited

U.S. PATENT DOCUMENTS

| 2008/0063902 | A1* | 3/2008 | Kawasaki | H01M 8/04007 429/10 |
|---|---|---|---|---|
| 2010/0178577 | A1 | 7/2010 | Morita et al. | |
| 2011/0143249 | A1* | 6/2011 | Izawa | H01M 8/04007 429/441 |

FOREIGN PATENT DOCUMENTS

| JP | 2008-112741 A | | 5/2008 | |
|---|---|---|---|---|
| JP | 2010-015783 A | | 1/2010 | |
| JP | 2010040378 A | * | 2/2010 | ........ H01M 8/04007 |
| JP | 2011-009099 A | | 1/2011 | |
| WO | 2008/044481 A1 | | 4/2008 | |

OTHER PUBLICATIONS

An Office Action; "Notification of Reasons for Refusal," issued by the Japanese Patent Office dated Jan. 27, 2015, which corresponds to Japanese Patent Application No. 2011-213575 and is related to U.S. Appl. No. 14/348,030; with English language summary.
Extended European Search Report dated Jan. 4, 2016 issued by the European Patent Office for Counterpart European Application No. EP12806410.
International Search Report; PCT/JP2012/075251; dated Dec. 25, 2012.

* cited by examiner

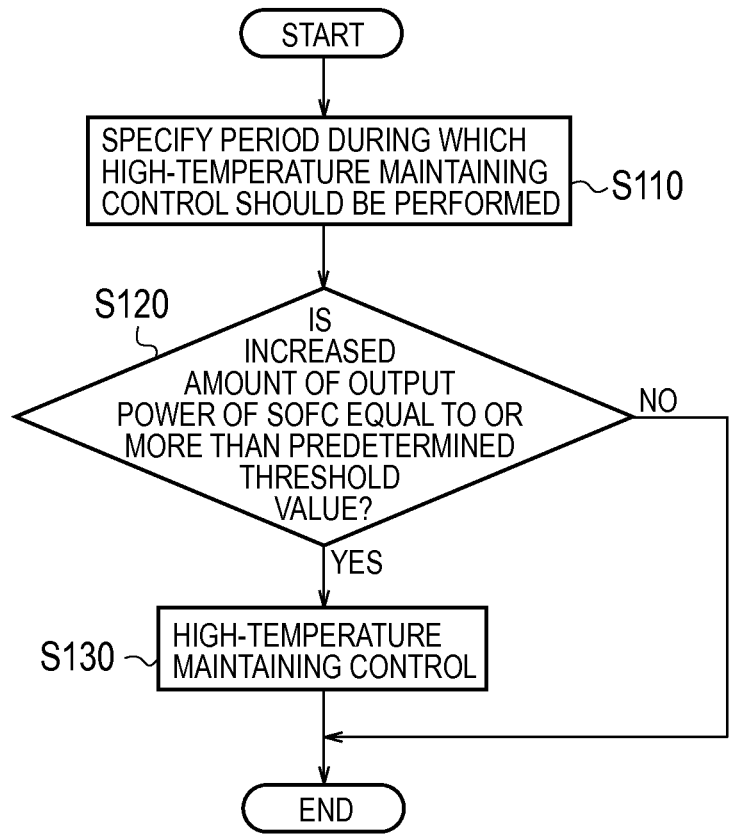
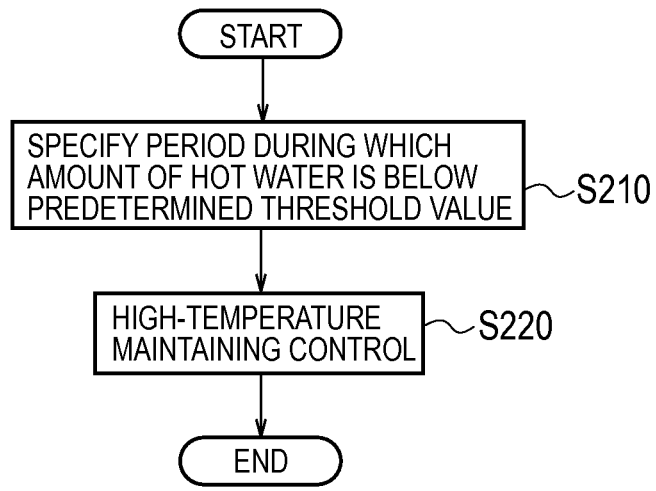

ENERGY MANAGEMENT SYSTEM, ENERGY MANAGEMENT APPARATUS, AND POWER MANAGEMENT METHOD

TECHNICAL FIELD

The present invention relates to an energy management system provided with an energy management apparatus connected to a fuel cell and a load, the energy management apparatus, and a power management method.

BACKGROUND ART

In recent years, it is known a technology of controlling, for example, a load provided in a consumer or a dispersed power source provided in a consumer by a power management apparatus (for example, HEMS: Home Energy Management System) provided in each consumer.

Examples of the dispersed power source may include a fuel cell unit including a fuel cell such as an SOFC (Solid Oxide Fuel Cell). Examples of the dispersed power source may include a power generation equipment that utilizes clean energy such as sunlight, wind power, or geothermy.

In this case, generally, the power output from the fuel cell unit is controlled to follow power consumption of a load provided in a consumer (for example, Patent Literature 1).

Meanwhile, when a state in which power consumption of a load is low is continued, the temperature of a fuel cell during an operation is decreased. In the state where the temperature of the fuel cell during an operation is decreased, load followability of the fuel cell worsens, thus power supplied from the fuel cell can no longer follow the power consumption of the load.

CITATION LIST

Patent Literature

Patent Literature 1: Japanese Patent Application Publication No. 2010-15783

SUMMARY OF THE INVENTION

An energy management system according to the first feature is provided with a fuel cell and a load. The energy management system comprises: a control unit that performs high-temperature maintaining control maintaining a temperature of the fuel cell during an operation within a predetermined temperature range; and a specifying unit that specifies a period during which the high-temperature maintaining control should be performed. The control unit performs the high-temperature maintaining control in the period specified by the specifying unit.

In the first feature, the control unit heats the fuel cell by a heater in the high-temperature maintaining control.

In the first feature, the specifying unit specifies a period during which power consumption of the load is below a predetermined threshold value as a period during which the high-temperature maintaining control should be performed, on the basis of a history of the power consumption of the load.

In the first feature, exhaust heat generated by an operation of the fuel cell is used for warming water stored in a hot water storage unit. The control unit decreases an amount of hot water returned to the hot water storage unit in the high-temperature maintaining control.

In the first feature, the specifying unit specifies a period during which an amount of hot water stored in the hot water storage unit exceeds a predetermined threshold value as a period during which the high-temperature maintaining control should be performed, on the basis of a use history of the hot water stored in the hot water storage unit.

In the first feature, exhaust heat generated by an operation of the fuel cell is used for warming water stored in a hot water storage unit. The control unit stops the high-temperature maintaining control when an amount of hot water stored in the hot water storage unit is less than a predetermined threshold value.

In the first feature, the control unit always performs the high-temperature maintaining control in a state of an independent operation.

In the first feature, another power generation equipment is further connected to the energy management system. The specifying unit specifies, in a state where power generated by the another power generation equipment is not allowed to be sold, a time zone in which a large amount of power generation by the another power generation equipment is expected, as a period during which the high-temperature maintaining control should be performed.

In the first feature, another power generation equipment is further connected to the energy management system. The specifying unit specifies, in a state where a unit price per unit amount of power generation by the fuel cell exceeds a power selling unit price of power generation by the another power generation equipment, a time zone in which a large amount of power generation is expected, as a period during which the high-temperature maintaining control should be performed.

An energy management apparatus according to the second feature is connected to a fuel cell and a load. The power management apparatus comprises: a control unit that performs high-temperature maintaining control maintaining the temperature of the fuel cell during an operation within a predetermined temperature range; and a specifying unit that specifies a period during which the high-temperature maintaining control should be performed. The control unit performs the high-temperature maintaining control in the period specified by the specifying unit.

A power management method according to the third feature is applied to an energy management system provided with an energy management apparatus connected to a fuel cell and a load. The power management method comprises: a step A of specifying a period during which high-temperature maintaining control should be performed, the high-temperature maintaining control maintaining a temperature of the fuel cell during an operation within a predetermined temperature range; and a step B of performing the high-temperature maintaining control in the period specified by the specifying unit.

An energy management system according to the fourth feature is provided with a fuel cell and a load. The power management system comprises: a control unit that performs high-temperature maintaining control maintaining a temperature of the fuel cell during an operation within a predetermined temperature range. The control unit always maintains the high-temperature maintaining control in a state of an independent operation, and performs the high-temperature maintaining control when a predetermined condition is satisfied during grid interconnection.

An energy management apparatus according to the fifth feature is connected to a fuel cell and a load. The power management apparatus comprises: a control unit that performs high-temperature maintaining control maintaining the temperature of the fuel cell during an operation within a predetermined temperature range. The control unit always maintains the high-temperature maintaining control in a state of an independent operation, and performs the high-temperature maintaining control when a predetermined condition is satisfied during grid interconnection.

A power management method according to the sixth feature is applied to an energy management system provided with an energy management apparatus connected to a fuel cell and a load. The power management method comprises: a step A of always performing high-temperature maintaining control that maintains a temperature of the fuel cell during an operation within a predetermined temperature range in a state of an independent operation; and a step B of performing the high-temperature maintaining control when a predetermined condition is satisfied during grid interconnection.

BRIEF DESCRIPTION OF THE DRAWINGS

FIG. 3 is a sequence diagram showing the power management method according to the first feature.

FIG. 4 is a sequence diagram showing the power management method according to the first feature.

DESCRIPTION OF THE EMBODIMENT

Figure 1:
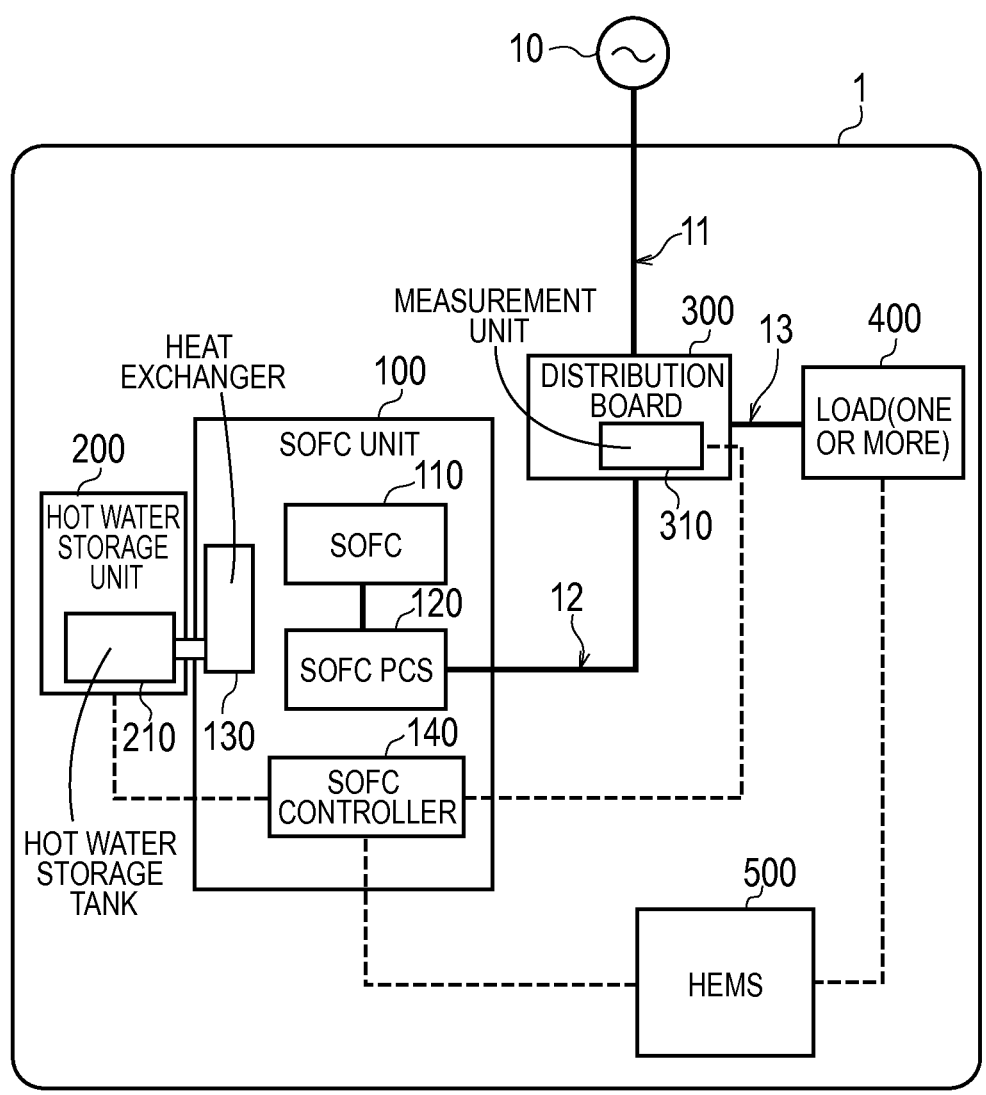
FIG. 1 is a diagram of a power management system 1 according to the first feature.

With reference to the drawings, the energy management system according to the embodiment of the present invention will be described. In the drawings of the following embodiments, the same or similar reference signs are applied to the same or similar portions.

It must be understood that the drawings are schematic, and the ratio of each dimension and the like may differ from the real one. Accordingly, specific dimensions and the like should be understood with reference to the following description. Furthermore, it must be understood that, the relationship or ratio of dimensions included in each of the drawings may differ.

SUMMARY OF THE EMBODIMENT

Firstly, the energy management system is provided with a fuel cell and a load. The power management system comprises: a control unit that performs high-temperature maintaining control maintaining a temperature of the fuel cell during an operation within a predetermined temperature range. The control unit always maintains the high-temperature maintaining control in a state of an independent operation, and performs the high-temperature maintaining control when a predetermined condition is satisfied during grid interconnection.

In the embodiment, the control unit always maintains the high-temperature maintaining control in the state of an independent operation. This restrains a situation in which the power supplied from the fuel cell runs short due to worsening in the load followability of the fuel cell. On the other hand, the control unit performs the high-temperature maintaining control when a predetermined condition is satisfied during the grid interconnection. Therefore, increase in energy cost due to unnecessary high-temperature maintaining control is restrained. That is, cost advantage can rather be gained by complementing the shortage in the power supplied from the fuel cell with power supplied from a system.

Secondly, the energy management system is provided with a fuel cell and a load. The energy management system comprises: a control unit that performs high-temperature maintaining control maintaining a temperature of the fuel cell during an operation within a predetermined temperature range; and a specifying unit that specifies a period during which the high-temperature maintaining control should be performed. The control unit performs the high-temperature maintaining control in the period specified by the specifying unit.

In the embodiment, the control unit performs the high-temperature maintaining control in the period specified by the specifying unit. This makes it possible to appropriately restrain worsening in the load followability of the fuel cell. Further, the increase in energy cost due to unnecessary high-temperature maintaining control is also restrained.

First Embodiment (Energy Management System)

Hereinafter, an energy management system according to a first embodiment will be described. FIG. 1 is a diagram of a power management system 1 according to the first embodiment.

As shown in FIG. 1, the power management system 1 includes an SOFC unit 100, a distribution board 300, a load 400, and an HEMS 500.

The SOFC unit 100 is a unit including equipment (Solid Oxide Fuel Cell) that outputs power (for example, DC power) by a chemical reaction between hydrogen extracted from natural gas, for example, and oxygen in the air.

In particular, the SOFC unit 100 includes an SOFC 110, an SOFC PCS 120, a heat exchanger 130, and an SOFC controller 140.

The SOFC 110 is equipment (Solid Oxide Fuel Cell) that generates power (for example, DC power) by a chemical reaction between hydrogen extracted from gas, etc., and oxygen in the air. The SOFC 110 is an example of the fuel cell. An amount of power generation by the SOFC 110 varies depending on an amount of gas and air supplied to the SOFC 110. The amount of gas and air supplied to the SOFC 110 is controlled by the SOFC controller 140.

The SOFC PCS 120 converts the DC power output from the SOFC 110 into AC power. The SOFC PCS 120 outputs the AC power to the distribution board 300 via a power line 12.

The heat exchanger 130 is linked with a hot water storage tank 210 and warms water supplied from the hot water storage tank 210 with exhaust heat generated by an operation (power generation) of the SOFC 110. In particular, the heat exchanger 130 warms the water supplied from the hot water storage tank 210 and returns warmed hot water to the hot water storage tank 210. In this way, the exhaust heat generated by the operation (power generation) of the SOFC 110 is used for warming water supplied from the hot water storage tank 210.

The SOFC controller 140 performs control for performing a load following operation. Specifically, the SOFC controller 140 controls the SOFC 110 so that the power output from the SOFC unit 100 (SOFC 110) follows the power consumption of the load 400.

The SOFC controller 140 decides a target output power value of the SOFC unit 100 (SOFC 110) so that the power supplied from a grid 10 reaches a predetermined value (for example, zero). The SOFC controller 140 controls the SOFC 110 so that the power output from the SOFC unit 100 (SOFC 110) reaches a target output power value.

The power supplied from the grid 10 varies depending on the power consumption of the load 400. Therefore, it should be noted that even in a case of deciding the target output power value according to the power supplied from the grid 10, the power output from the SOFC unit 100 (SOFC 110) follows the power consumption of the load 400.

Alternatively, the SOFC controller 140 decides the target output power value equal to the power consumption of the load 400. The SOFC controller 140 controls the SOFC 110 so that the power output from the SOFC unit 100 (SOFC 110) reaches a target output power value.

In the first embodiment, the SOFC controller 140 notifies the temperature of the SOFC 110 during an operation to the HEMS 500. The temperature of the SOFC 110 during an operation can be measured by, for example, a thermometer provided together with the SOFC 110.

The hot water storage unit 200 has the hot water storage tank 210 linked with the heat exchanger 130. The hot water storage tank 210 stores the hot water warmed by the exhaust heat generated by the operation of the SOFC 110. Further, the hot water storage unit 200 has a function of controlling the amount of hot water stored in the hot water storage tank 210 by adjusting the amount of water supplied to the heat exchanger 130, and the like.

In this case, the hot water storage unit 200 notifies the amount of hot water stored in the hot water storage tank 210 to the HEMS 500 via the SOFC controller 140. The "amount of hot water stored" may be regarded as a value converted into temperature (that is, the amount of heat stored).

The distribution board 300 is connected to the grid 10 via a power line 11, connected to the SOFC unit 100 via a power line 12, and connected to the load 400 via a power line 13. The distribution board 300 distributes the power supplied from the grid 10 via the power line 11 and the power supplied from the SOFC unit 100 via the power line 12, to the load 400 via the power line 13.

In the first embodiment, the distribution board 300 includes the measurement unit 310. The measurement unit 310 measures the power supplied from the grid 10. In addition, the measurement unit 310 measures power consumption of the load 400

When there are provided a plurality of loads 400, the measurement unit 310 may measure a sum of power consumption of the loads 400, or may individually measure power consumption of each load 400.

In this case, the measurement unit 310 is connected to the SOFC unit 100 and the HEMS 500 via a signal line, and transmits a measured value to the SOFC unit 100 and the HEMS 500.

The load 400 is equipment that consumes the power supplied via the power line 13. Examples of the load 400 include equipment such as a refrigerator, lighting, an air conditioner, and TV. The load 400 may be single equipment, and may include a plurality of equipment.

The HEMS 500 is an apparatus (HEMS: Home Energy Management System) that manages the power of the consumer. The HEMS 500 is connected to the SOFC unit 100, the distribution board 300 (measurement unit 310), and the load 400 via a signal line. The HEMS 500 includes a function of controlling an operation mode of the load 400. The HEMS 500 is an example of an energy management apparatus.

Figure 2:
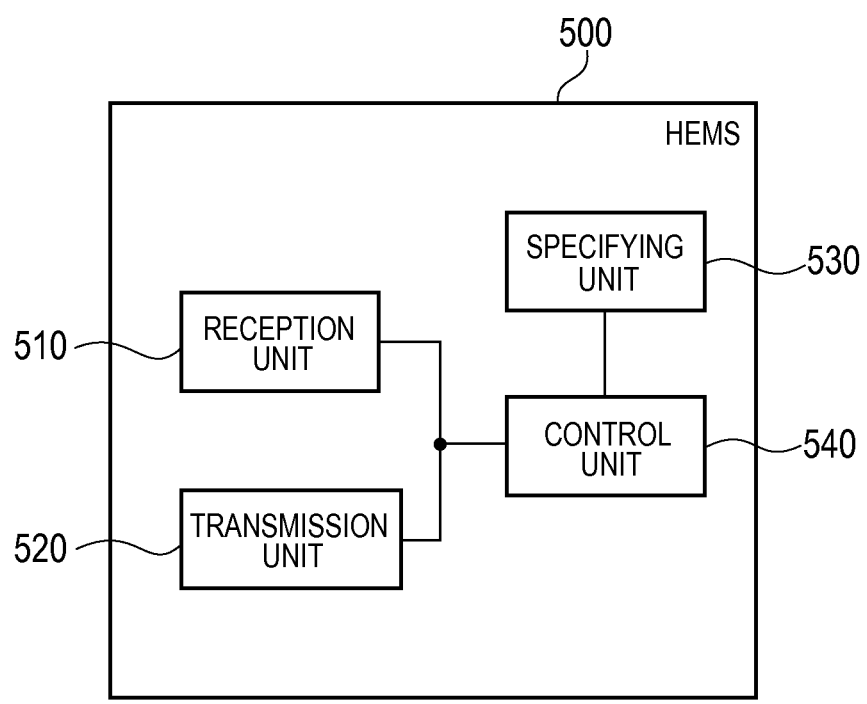
FIG. 2 is a block diagram of the HEMS 500 according to the first feature.

In particular, as shown in FIG. 2, the HEMS 500 includes a reception unit 510, a transmission unit 520, a specifying unit 530, and a control unit 540.

The reception unit 510 receives various types of information from the SOFC controller 140, the distribution board 300 (the measurement unit 310), and the load 400. For example, the reception unit 510 receives, from the SOFC controller 140, information indicating the amount of hot water stored in the hot water storage tank 210 and information indicating the temperature of the SOFC 110 during an operation. The reception unit 510 receives, from the measurement unit 310, power (measured value) supplied from the grid 10 or the power consumption (the measured value) of the load 400. The reception unit 510 may receive, from the load 400, load state information indicating a state (power ON/OFF, an operation mode) of the load 400.

In the first embodiment, the information received from at least one of the measurement unit 310 and the load 400 is accumulated in a memory unit (not shown) and the information is preferably managed in the memory unit as a history of the power consumption of the load 400. Further, the information indicating the amount of hot water stored in the hot water storage tank 210 is accumulated in the memory unit (not shown) and the information is preferably managed in the memory unit as a use history of the hot water stored in the hot water storage tank 210.

The transmission unit 520 transmits various types of information to the SOFC unit 100 and the load 400. In particular, the transmission unit 520 transmits a temperature control signal for performing the high-temperature maintaining control that maintains the temperature of the SOFC 110 during an operation within a predetermined temperature range.

In this case, the high-temperature maintaining control may be performed by heating the SOFC 110 by a heater provided together with the SOFC 110. In such a case, the transmission unit 520 transmits the temperature control signal to the heater. Alternatively, the high-temperature maintaining control may be performed by decreasing the amount of hot water returned to the hot water storage tank 210. In such a case, the transmission unit 520 transmits the temperature control signal to the hot water storage unit 200. The decrease in the amount of hot water returned to the hot water storage tank 210 indicates decrease with respect to the amount of hot water (the normal amount of hot water) returned to the hot water storage tank 210 in a state where the high-temperature maintaining control is not performed.

The transmission unit 520 may transmit, to the load 400, load control information for controlling the load 400.

The specifying unit 530 specifies a period during which the high-temperature maintaining control should be performed. Specifically, the specifying unit 530 specifies a period during which power output (the amount of power generation) by the SOFC 110 is below a predetermined threshold value as a period during which the high-temperature maintaining control should be performed. The specifying unit 530 may exclude the period during which the increased amount of the power output (the amount of power generation) by the SOFC 110 is less than the predetermined threshold value, from the period during which the high-temperature maintaining control should be performed. For example, the specifying unit 530 specifies the period during which the high-temperature maintaining control should be performed, by the following five methods.

Firstly, the specifying unit 530 specifies a period during which the power consumption of the load 400 is below a predetermined threshold value as a period during which the high-temperature maintaining control should be performed, on the basis of the history of the power consumption of the load 400. In other words, the specifying unit 530 specifies a period during which the temperature of the SOFC 110 during an operation is decreased. However, in a case where the period during which the power consumption of the load 400 is below the predetermined threshold value, is continued for a long term, that is, in a case where increase in the power consumption of the load 400 cannot be expected, the specifying unit 530 may exclude the period during which the increased amount of the power consumption of the load 400 is below a predetermined threshold value, from the period during which the high-temperature maintaining control should be performed.

Secondly, the specifying unit 530 may specify a period during which the amount of hot water stored in the hot water storage tank 210 exceeds a predetermined threshold value as the period during which the high-temperature maintaining control should be performed, on the basis of the use history of the hot water stored in the hot water storage tank 210. In other words, the specifying unit 530 specifies a period during which the used amount of the hot water stored in the hot water storage tank 210 is small. When the amount of hot water stored in the hot water storage tank 210 is large, even when the amount of hot water returned to the hot water storage tank 210 is decreased, the amount of hot water stored in the hot water storage tank 210 never runs short.

Thirdly, the specifying unit 530 may specify the period during which the high-temperature maintaining control should be performed, on the basis of the combination of the history of the power consumption of the load 400 and the use history of the hot water stored in the hot water storage tank 210. For example, the specifying unit 530 may specify the period during which the power consumption of the load 400 is below a predetermined threshold value or the period during which the amount of hot water in the hot water storage tank 210 exceeds the predetermined threshold value. Alternatively, the specifying unit 530 may specify the period during which the power consumption of the load 400 is below a predetermined threshold value and the amount of hot water in the hot water storage tank 210 exceeds a predetermined threshold value.

Fourthly, the specifying unit 530 may specify the period during which the high-temperature maintaining control should be performed, on the basis of whether or not it is possible to sell power generated by another power generation equipment such as a photovoltaic cell, and on the basis of a time zone. That is, when a power generation equipment, such as a photovoltaic cell, of which the amount of power generation varies in accordance with a time zone, is connected together to the load as another power generation equipment, the amount of the output of the power generation equipment is taken into consideration. For example, in the case of the photovoltaic cell, the amount of power generation is large during daytime and the amount of power generation is small during nighttime. Further, when power cannot be sold from the side of the another power generation equipment as in a case where voltage on the side of the photovoltaic cell is increased and reverse power flow is prohibited, in spite of being in a time zone in which a large amount of power generation is expected, the amount of dependence on the amount of power generation by the SOFC 110 is decreased and the temperature of the SOFC 110 during an operation is lowered. In this case, when reverse power flow is allowed next time, the power generated from the another power generation equipment is to be sold, and thus, the SOFC 110 may be suddenly required to increase the amount of power generation. Therefore, in a state where the power generated by the another power generation equipment is not allowed to be sold, the time zone in which a large amount of power generation is expected may be specified as a period during which the high-temperature maintaining control is performed.

Fifthly, the specifying unit 530 may specify the period during which the high-temperature maintaining control should be performed, on the basis of a result of comparing the power selling unit price of the power generated by the another power generation equipment with the unit price of power generation by an SOFC. That is, like an example indicated as a fourth method of specifying a period, in the time zone in which power can be sold and a large amount of power generation is expected, the unit price of power generation, by the SOFC 110, per unit amount is compared with the power selling unit price of power generation by the another power generation equipment such as a photovoltaic cell. When the former exceeds the latter, the power generated by the another power generation equipment is not sold but allocated for consumption of the load. Therefore, the amount of dependence on the amount of power generation by the SOFC 110 is decreased, and the temperature of the SOFC 110 during an operation is lowered. Therefore, in a state where the unit price of power generation, by the SOFC 110, per unit amount exceeds the power selling unit price of power generation by the another power generation equipment of the another power generation equipment, the time zone in which a large amount of power generation is expected may be specified as a period during which the high-temperature maintaining control is performed.

The control unit 540 controls the HEMS 500. Specifically, the control unit 540 performs the high-temperature maintaining control maintaining the temperature of the SOFC 110 during an operation within a predetermined temperature range.

In the first embodiment, it is preferable for the control unit 540 to always maintain the high-temperature maintaining control in the state of the independent operation, and to perform the high-temperature maintaining control when the predetermined condition is satisfied during the grid interconnection.

The predetermined condition is, for example, that the period during which the high-temperature maintaining control should be performed is specified by the specifying unit 530, and a current time is included in the period during which the high-temperature maintaining control should be performed.

Further, a method of performing the high-temperature maintaining control by the control unit 540 may include the following two methods.

Firstly, the control unit 540 heats the SOFC 110 by the heater provided together with the SOFC 110 in the high-temperature maintaining control. That is, the control unit 540 instructs the transmission unit 520 to transmit a temperature control signal to the heater.

In this case, in a case where the SOFC 110 is heated by the heater, the period during which the high-temperature maintaining control should be performed is preferably specified on the basis of the history of the power consumption of the load 400. However, the period during which the high-temperature maintaining control should be performed may be specified on the basis of the use history of the hot water stored in the hot water storage tank 210.

Secondly, the control unit 540 decreases the amount of hot water returned to the hot water storage tank 210 in the high-temperature maintaining control. That is, the control unit 540 instructs the transmission unit 520 to transmit a temperature control signal for the hot water storage unit 200.

In this case, in a case where the amount of hot water returned to the hot water storage tank 210 is decreased, the period during which the high-temperature maintaining control should be performed is preferably specified on the basis of the use history of the hot water stored in the hot water storage tank 210. However, the period during which the high-temperature maintaining control should be performed may be specified on the basis of the history of the power consumption of the load 400.

The control unit 540 may heat the SOFC 110 by the heater and decrease the amount of hot water returned to the hot water storage tank 210 in the high-temperature maintaining control.

(Energy Management Method)

Hereinafter, an energy management method according to the first embodiment will be described. Each of FIG. 3 and FIG. 4 is a sequence diagram showing the energy management method according to the first embodiment.

Firstly, a description will be given of a case where the period during which the high-temperature maintaining control should be performed is specified on the basis of the history of the power consumption of the load 400, with reference to FIG. 3.

As shown in FIG. 3, in step 110, the HEMS 500 specifies the period during which the high-temperature maintaining control should be performed. Specifically, the HEMS 500 specifies the period during which the power output (the amount of power generation) by the SOFC 110 is below a predetermined threshold value, as a period during which the high-temperature maintaining control should be performed. For example, the HEMS 500 specifies the period during which the high-temperature maintaining control should be performed, by the above-described five methods. For example, the HEMS 500 specifies the period during which the power consumption of the load 400 is below a predetermined threshold value.

In step 120, the HEMS 500 determines whether or not the increased amount of the power output (the amount of power generation) by the SOFC 110 is equal to or more than a predetermined threshold value. When a determination result is "YES", the HEMS 500 proceeds to a process in step 130. Meanwhile, the HEMS 500 ends a series of processes when the determination result is "NO".

For example, when the increase in the power consumption of the load 400 can be expected, the HEMS 500 proceeds to the process in step 130.

It should be noted that processes of step 110 and step 120 are described together in the above-described five methods.

In step 130, the HEMS 500 performs the high-temperature maintaining control in the period specified in step 110. In this case, the HEMS 500 preferably heats the SOFC 110 by the heater.

Secondly, a description will be given of a case where the period during which the high-temperature maintaining control should be performed is specified on the basis of the use history of the hot water stored in the hot water storage tank 210, with reference to FIG. 4.

As shown in FIG. 4, in step 210, the HEMS 500 specifies the period during which the high-temperature maintaining control should be performed, on the basis of the use history of the hot water stored in the hot water storage tank 210. In particular, the HEMS 500 specifies the period during which the amount of hot water stored in the hot water storage tank 210 exceeds a predetermined threshold value.

In step 220, the HEMS 500 performs the high-temperature maintaining control in the period specified in step 210. In this case, the HEMS 500 preferably decreases the amount of hot water returned to the hot water storage tank 210.

Operation and Effect

In the first embodiment, the HEMS 500 always maintains the high-temperature maintaining control in the state of the independent operation. This restrains a situation in which power supplied from the SOFC 110 runs short due to worsening in load followability of the SOFC 110. On the other hand, the HEMS 500 performs the high-temperature maintaining control when a predetermined condition is satisfied during the grid interconnection. Therefore, increase in energy cost due to unnecessary high-temperature maintaining control is restrained. That is, rather, cost advantage can be gained by complementing the shortage in the power supplied from the SOFC 110 with the power supplied from the system.

In the first embodiment, the HEMS 500 performs the high-temperature maintaining control in a period specified by the specifying unit 530. This makes it possible to appropriately restrain worsening in the load followability of the SOFC 110. Further, the increase in energy cost due to unnecessary high-temperature maintaining control is also restrained.

First Modification

Hereinafter, a first modification of the first embodiment will be described. Mainly differences from the first embodiment will be described below.

Specifically, in the first modification, the HEMS 500 stops the high-temperature maintaining control when the amount of hot water stored in the hot water storage tank 210 is less than a predetermined threshold value.

For example, when the period during which the high-temperature maintaining control should be performed is specified on the basis of the history of the power consumption of the load 400, a case where the amount of hot water stored in the hot water storage tank 210 is less than the predetermined threshold value may be considered. In such a case, when the high-temperature maintaining control is control that decreases the amount of hot water returned to the hot water storage tank 210, the amount of hot water stored in the hot water storage tank 210 may run short.

Therefore, in the first modification, the HEMS 500 assumes such a case and stops the high-temperature maintaining control when the amount of hot water stored in the hot water storage tank 210 is less than the predetermined threshold value.

Other Embodiments

As described above, the present invention has been described according to the embodiment. It must not be understood that, however, the discussions and the drawings constituting a part of this disclosure limit the present invention. From this disclosure, various alternative embodiments, examples and operational techniques will be apparent to those skilled in the art.

In the embodiment, as the energy management apparatus, the HEMS 500 is described as an example. However, the energy management apparatus may be a BEMS (Building and Energy Management System) or an FEMS (Factory Energy Management System), for example.

In the embodiment, the HEMS 500 specifies the period during which the high-temperature maintaining control should be performed, on the basis of the history of the power consumption of the load 400 or the use history of the hot water stored in the hot water storage tank 210. However, the embodiment is not limited thereto. The HEMS 500 may always monitor the power consumption of the load 400 and specify the period during which the high-temperature maintaining control should be performed. Similarly, the HEMS 500 may always monitor the used amount of the hot water stored in the hot water storage tank 210 and specify the period during which the high-temperature maintaining control should be performed.

In the embodiment, the HEMS 500 always performs the high-temperature maintaining control during the independent operation. However, the embodiment is not limited thereto. The HEMS 500 may perform the high-temperature maintaining control in the period specified by the specifying unit 530 even during the independent operation.

Although not particularly described in the embodiment, a function of the control unit 530 may be provided in an apparatus other than the HEMS 500. For example, the SOFC controller 130 or the distribution board 300 may include the function of the control unit 530.

Although not particularly described in the embodiment, communication in a network configured by the HEMS 500 and each equipment (the SOFC unit 100, the hot water storage unit 200, the distribution board 300, and the load 400) is preferably performed in compliance with a predetermined protocol (ECHONET Lite, ZigBEE SEP2.0, KNX, etc.). In such a case, between the HEMS 500 and each equipment (the SOFC unit 100, the hot water storage unit 200, the distribution board 300, and the load 400), various types of commands are communicated in a format defined in a predetermined protocol. For example, information indicating an amount of hot water stored in the hot water storage tank 210 and information indicating a temperature of the SOFC 110 during an operation that are notified by the SOFC unit 100 to the HEMS 500, the load state information (power ON/OFF, operation mode) notified by the load 400 to the HEMS 500, and operation mode designation information (information for designating an operation mode of the load 400) notified by the HEMS 500 to the load 400 are notified in a format defined in a predetermined protocol.

Note that the entire content of the Japanese Patent Application No. 2011-213575 (filed on Sep. 28, 2011) is incorporated herein by reference.

INDUSTRIAL APPLICABILITY

According to the present invention, it is possible provide an energy management system, energy management apparatus and power management method capable of improving load followability of a fuel cell unit.

The invention claimed is:

1. An energy management system provided with a fuel cell and a load, comprising:
a controller programmed to
perform high-temperature maintaining control maintaining a temperature of the fuel cell during an operation within a predetermined temperature range, and
specify a period during which the high-temperature maintaining control should be performed;
a hot water storage including a hot water storage tank;
a heat exchanger, a supply link from the hot water storage tank to the heat exchanger, a return link from the heat exchanger to the hot water storage tank, the heat exchanger configured to heat water supplied through the supply link from the hot water storage tank with exhaust heat generated by an operation of the fuel cell and return heated water through the return link to the hot water storage tank,
wherein
the controller is programmed to automatically perform the high-temperature maintaining control in response to a start of the specified period by decreasing, without stopping, an amount of hot water returned by the heat exchanger through the return link to the hot water storage tank, and
the specified period is a period during which power consumption of the load is below a predetermined threshold value.

2. The energy management system according to claim 1, wherein the controller is programmed to heat the fuel cell by a heater in the high-temperature maintaining control.

3. The energy management system according to claim 1, wherein the controller is programmed to specify a period during which an amount of hot water stored in the hot water storage tank exceeds a predetermined threshold value as a period during which the high-temperature maintaining control should be performed, on the basis of a use history of the hot water stored in the hot water storage tank.

4. The energy management system according to claim 1, wherein the controller is programmed to stop the high-temperature maintaining control when an amount of hot water stored in the hot water storage tank is less than a predetermined threshold value.

5. The energy management system according to claim 1, wherein the controller is programmed to always perform the high-temperature maintaining control in a state of an independent operation.

6. The energy management system according to claim 1, wherein another power generation equipment is further connected to the energy management system, and the controller is programmed to specify, in a state where power generated by the another power generation equipment is not allowed to be sold, a time zone in which a large amount of power generation by the another power generation equipment is expected, as a period during which the high-temperature maintaining control should be performed.

7. The energy management system according to claim 1, wherein another power generation equipment is further connected to the energy management system, and the controller is programmed to specify, in a state where a unit price per unit amount of power generation by the fuel cell exceeds a power selling unit price of power generation by the another power generation equipment, a time zone in which a large amount of power generation is expected, as a period during which the high-temperature maintaining control should be performed.

* * * * *